United States Patent
Kotelba (10) Patent No.: US 7,876,696 B2
(45) Date of Patent: Jan. 25, 2011

(54) ADAPTIVE UPSTREAM BANDWIDTH ESTIMATION AND SHAPING

(75) Inventor: Marek R. Kotelba, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 699 days.

(21) Appl. No.: 11/586,145

(22) Filed: Oct. 25, 2006

(65) Prior Publication Data

US 2007/0177626 A1 Aug. 2, 2007

Related U.S. Application Data

(60) Provisional application No. 60/762,737, filed on Jan. 27, 2006.

(51) Int. Cl.
*G01R 31/08* (2006.01)
*H04L 12/28* (2006.01)
*H04J 3/16* (2006.01)
*H04J 3/18* (2006.01)

(52) U.S. Cl. .............. 370/252; 370/395.21; 370/395.41; 370/468; 370/477

(58) Field of Classification Search ................. 370/468, 370/252, 352; 709/232
See application file for complete search history.

(56) References Cited

U.S. PATENT DOCUMENTS

| | | | |
|---|---|---|---|
| 5,289,462 A | 2/1994 | Ahmadi et al. | |
| 6,381,628 B1 | 4/2002 | Hunt | |
| 6,570,883 B1 | 5/2003 | Wong | |
| 6,597,660 B1 | 7/2003 | Rueda et al. | |
| 6,925,068 B1 * | 8/2005 | Stanwood et al. | 370/329 |
| 6,930,983 B2 * | 8/2005 | Perkins et al. | 370/252 |
| 6,996,626 B1 * | 2/2006 | Smith | 709/232 |
| 7,002,919 B1 | 2/2006 | El-Sayed | |
| 7,031,712 B2 | 4/2006 | Takano et al. | |
| 7,039,712 B2 | 5/2006 | Valavi et al. | |
| 7,653,086 B2 * | 1/2010 | Beser | 370/468 |
| 7,751,315 B1 * | 7/2010 | Pai et al. | 370/230 |
| 2003/0016630 A1 | 1/2003 | Vega-Garcia et al. | |
| 2003/0110206 A1 | 6/2003 | Osokine | |
| 2004/0199659 A1 | 10/2004 | Ishikawa et al. | |
| 2004/0213265 A1 | 10/2004 | Oueslati et al. | |
| 2005/0074007 A1 | 4/2005 | Samuels et al. | |
| 2005/0226156 A1 | 10/2005 | Keating et al. | |
| 2005/0226249 A1 | 10/2005 | Moore | |
| 2006/0045023 A1 * | 3/2006 | Kim et al. | 370/252 |
| 2006/0156201 A1 | 7/2006 | Zhang et al. | |

* cited by examiner

*Primary Examiner*—Huy D Vu
*Assistant Examiner*—Brandon Renner
(74) *Attorney, Agent, or Firm*—Steven A. Shaw; W. James Brady; Frederick J. Telecky, Jr.

(57) ABSTRACT

One embodiment of the present invention includes a method for adaptively estimating available upstream bandwidth in a network. The method comprises monitoring data indicative of a number of lost packets at a near-end communication device. The data indicative of a number of lost packets can be periodically transmitted from a far-end communication device. The method also comprises increasing an amount of upstream bandwidth transmission until the monitored data exceeds a threshold. The method also comprises calculating an estimated available upstream bandwidth based on a portion of a maximum amount of the upstream bandwidth transmission.

18 Claims, 3 Drawing Sheets

ADAPTIVE UPSTREAM BANDWIDTH ESTIMATION AND SHAPING

RELATED APPLICATION

This application claims the benefit of U.S. Provisional Patent Application No. 60/762,737, which was filed on Jan. 27, 2006, and entitled ADAPTIVE UPSTREAM BANDWIDTH ESTIMATOR AND SHAPER, which is incorporated herein by reference.

TECHNICAL FIELD

This invention relates to networking, and more specifically to adaptive upstream bandwidth estimation and shaping.

BACKGROUND

A voice communication device, such as including a Voice over Internet Protocol (VoIP) terminal adapter and/or residential gateway, located at a customer premises is typically connected to the Internet broadband service through a high-speed interface, such as the 10 Base-T or 100 Base-T Ethernet interface. The speed of this interface typically exceeds the upstream bandwidth of a broadband connection. A terminal adapter can often classify and prioritize communication packets to guarantee Quality of Service (QoS) for voice calls. For example, a terminal adapter can prioritize voice media stream packets over voice control packets over data packets to guarantee QoS for voice calls. However, a device providing broadband access to the terminal adapter, such as a cable or Digital Subscriber Line (DSL) modem, typically cannot classify and prioritize communication packets. If a given terminal adapter is not equipped with a transmit traffic shaper, the broadband access device can get overloaded, such that excess packets can be indiscriminately discarded, thus deteriorating QoS for VoIP calls.

A traffic shaper can be more effective if the upstream bandwidth of the broadband connection is known. In general, the end-user of the terminal adapter may not learn the amount of the upstream bandwidth from the Internet Service Provider (ISP), and hence the end-user may be unable to configure this bandwidth in the terminal adapter. In addition, the upstream bandwidth may fluctuate over time due to varying ISP network conditions. Likewise, a hosting Voice Service Provider (VSP) typically does not own the ISP network facilities. As such, the hosting VSP may not know the upstream bandwidth, and thus may not be able to remotely configure the terminal adapter or communicate the upstream bandwidth to the end-user.

SUMMARY

One embodiment of the present invention includes a method for adaptively estimating available upstream bandwidth in a network. The method comprises monitoring data indicative of a number of lost packets at a near-end communication device. The data indicative of a number of lost packets can be periodically transmitted from a far-end communication device. The method also comprises increasing an amount of upstream bandwidth transmission until the monitored data exceeds a threshold. The method also comprises calculating an estimated available upstream bandwidth based on a portion of a maximum amount of the upstream bandwidth transmission.

Another embodiment of the present invention includes a network terminal adapter configured to estimate and shape upstream bandwidth. The terminal adapter comprises bandwidth estimation logic configured to monitor data indicative of a number of lost packets transmitted from a far-end communication device. The bandwidth estimation logic can be further configured to estimate available upstream bandwidth upon the filtered data exceeding a threshold. The terminal adapter also comprises an upstream traffic shaper configured to allocate upstream bandwidth between voice traffic and data traffic based on the available upstream bandwidth estimate.

Another embodiment of the present invention includes a communication system. The communication system comprises a first communication device coupled to a first computer and a first voice communication device and a second communication device coupled to a second voice communication device. The second communication device can be configured to transmit communication link packets comprising data indicative of a number of lost packets in response to voice transmissions from at least the first voice communication device to the second voice communication device. The first communication device can be configured to generate and transmit synthetic packets in an increasing amount of bandwidth. The first communication device can monitor the data indicative of a number of lost packets to generate a bandwidth estimate associated with data transmissions associated with the first computer and voice transmissions associated with the first voice communication device from the first communication device to the second communication device upon the monitored data exceeding a threshold.

DETAILED DESCRIPTION

This invention relates to communications, and more specifically to adaptive upstream bandwidth estimation and shaping. A terminal adapter can receive data regarding lost packets from a far-end communication device. The data can be contained in, for example, communication link packets transmitted from the far-end communication device. The terminal adapter can filter the information to generate filtered data associated with the lost packets. Upon opening a voice communication channel, a terminal adapter can throttle data traffic associated with one or more computers to generate a nominal value for the filtered data, the filtered data being monitored for values above the nominal value. The terminal adapter can then generate and transmit synthetic packets in increasing amounts of bandwidth until the filtered data exceeds a threshold. The terminal adapter can then decrease the amount of synthetic packet bandwidth until the filtered data indicates an acceptable Quality of Service (QoS). The terminal adapter can thus estimate the available upstream bandwidth by adding the bandwidth associated with the synthetic packets with the upstream voice communication bandwidth.

Figure 1:
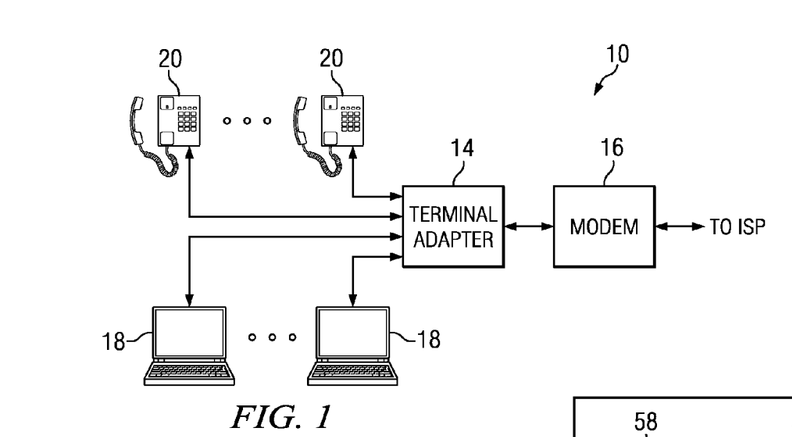
FIG. 1 illustrates an example of a near-end communication system in accordance with an aspect of the invention.

FIG. 1 illustrates an example of a near-end communication system 10 in accordance with an aspect of the invention. The near-end communication system 10 includes a terminal adapter 14 and a modem 16. The terminal adapter 14 is configured to provide routing and communication interface for one or more computers 18 and phones 20. For example, the terminal adapter 14 can convert voice and data communications into a packetized Ethernet communication protocol for transmission. Likewise, the terminal adapter 14 can also convert received voice and data packets into the appropriate communication format for the one or more computers 18 and/or phones 20. The modem 16 can provide an interface between the voice and data packets and an internet service provider (ISP, not shown) via a wide area network (WAN). For example, the modem 16 can modulate transmitted voice and data packets onto a cable or Digital Subscriber Line (DSL) communication medium, and can demodulate received voice and data packets for appropriate conversion and routing by the terminal adapter 14. As used herein, voice packets refer to packets of information that are transmitted within a communication system and contain primarily voice or speech (e.g., from a user), whereas data packets contain primarily data (e.g., from a computer, set top box or other processor based device).

One or more of the phones 20 can be a phone configured to communicate via Voice over Internet Protocol (VoIP). As another example, one or more of the phones 20 could be a standard phone configured to communicate on a Public Switched Phone Network (PSTN). As such, the terminal adapter 14 can include an interface to convert the voice communications of a given phone 20 from the PSTN protocol to VoIP for voice packet communication to and from the WAN. A Voice Service Provider (VSP) can provide voice communication service to a subscriber at the near-end communication system 10 via the ISP. Thus, the VSP can provide voice communication capability between a user at the near-end communication system 10 and a user at a far-end communication system.

The modem 16, which could be a cable modem or a DSL modem, can provide the broadband connectivity of the computers 18 and phones 20 to a WAN for communication with one or more far-end communication devices. For example, a given computer 18 and a given phone 20 in the near-end communication system 10 can concurrently transmit and receive communications between far-end communication devices at different far-end communication systems via the WAN. It is to be understood that a far-end communication device can include a phone and/or computer at a far-end communication system of an end-user, and/or can include one or more intermediate devices in the WAN, such as can be associated with an ISP and/or a VSP. As an example, a computer 18 at the near-end communication system 10 can transmit and receive data to and from a computer at a far-end communication system as the phone 20 at the near-end communication system 10 transmits and receives voice packets to and from a phone at a far-end communication system.

A voice communication session between two phones at different end-user communication systems may require a minimum available bandwidth to guarantee Quality of Service (QoS) for the call. For example, if an amount of collective bandwidth that is being transmitted from one or more phones 20 and computers 18 exceeds an amount of available upstream bandwidth of a given upstream device, such as the modem 16, voice and/or data packets may be dropped. As an example, the near-end modem 16 may be unable to transmit voice and data packets faster than they are received, such that memory buffers of the modem become overloaded, resulting in a loss of the excess packets. In addition, the modem 16 may not be able to distinguish voice packets from data packets, resulting in a potential loss of QoS as voice packets become dropped.

The terminal adapter 14 can be configured to adaptively estimate available upstream bandwidth, such that voice and data traffic can be shaped to the estimated available upstream bandwidth to preserve QoS for a given voice communication session across a network. It is to be understood that the term "bandwidth shaping" and "traffic shaping" is used herein to describe a process of manipulating, managing, or controlling network traffic from the near-end communication system 10 to the WAN and determining an allowed bandwidth consumption based on network activity of the WAN. As is described in greater detail below, the terminal adapter 14 can increase transmitted bandwidth and monitor data associated with lost voice packets, such that the available upstream bandwidth can be determined based on achieving a threshold associated with the lost voice packet data. It is also to be understood that, with regard to the discussion herein, the term "upstream bandwidth" can refer to an amount of bandwidth associated with transmissions from a near-end communication system, such as the near-end communication system 10 in the example of FIG. 1, to a far-end communication device.

Figure 2:
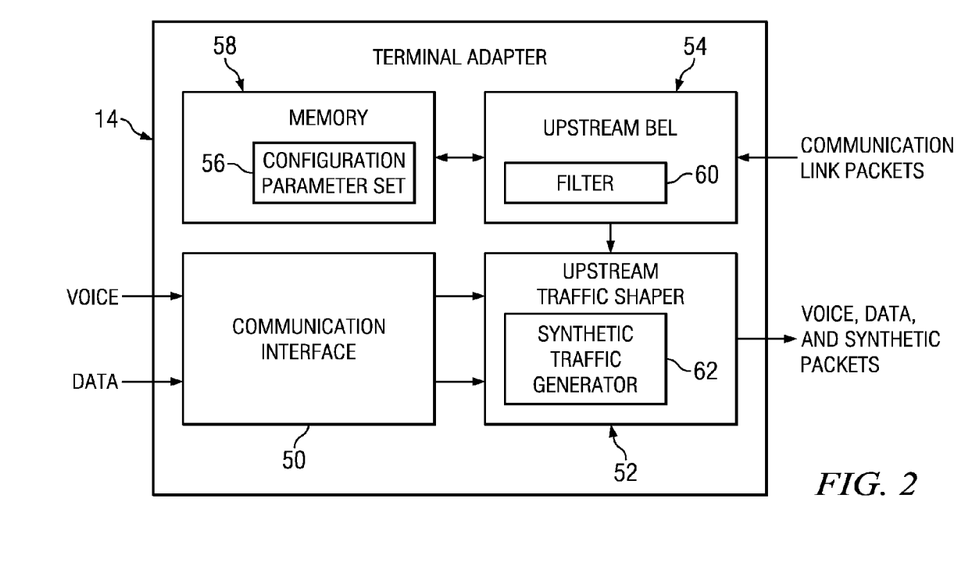
FIG. 2 illustrates an example of a terminal adapter in accordance with an aspect of the invention.

FIG. 2 illustrates an example of a terminal adapter 14 in accordance with an aspect of the invention. The terminal adapter 14 can be the terminal adapter 14 included in the near-end communication system 10 of FIG. 1. As such, reference is made to FIG. 1 and like reference numbers from FIG. 1 are used in the discussion of FIG. 2 to refer back to parts and features previously introduced with respect to FIG. 1. In addition, the discussion of FIG. 2 pertains to upstream communications, such that the focus of the discussion of FIG. 2 is with regard to the transmission of voice and data communications from the terminal adapter 14. However, it is to be understood that the terminal adapter 14 can also be configured to receive voice and data communications, and thus could also include additional components configured for the receipt of voice and data communications.

The terminal adapter 14 includes a communication interface 50. The communication interface 50 receives voice and data communications, for example, from one or more computers 18 and/or phones 20, and can convert the communications into a different communication format. As an example, the communication interface 50 can be configured to convert upstream voice communications from a PSTN protocol to VoIP voice packets. The communication interface 50 can thus packetize the voice and data communications for transmission onto an Ethernet communication interface. The communication interface 50 can also include downstream routing capability, such as to route voice and/or data communications from the WAN to the one or more computers 18 and/or phones 20.

The terminal adapter 14 also includes an upstream traffic shaper 52. The upstream traffic shaper 52 can separate voice packets from data packets for transmission of the voice and data packets to the ISP via the modem 16. As an example, to preserve QoS for voice communication, voice packets can be more time sensitive than data packets. As such, the upstream traffic shaper 52 can be configured to prioritize voice packets over data packets for transmission. However, despite the priority assignment of the upstream traffic shaper 52 with regard to voice packets over data packets, other devices on the network, such as the modem 16 in the example of FIG. 1, may not be able to distinguish voice packets and data packets, thus potentially resulting in a loss of QoS for a given call as packets are indiscriminately dropped. The terminal adapter 14 includes upstream bandwidth estimation logic (BEL) 54 configured to estimate the available upstream bandwidth. The upstream BEL 54 can provide commands to the upstream traffic shaper 52 to control the distribution of transmission bandwidth and sequence for voice and data packets based on the available upstream bandwidth estimate. For example, the upstream BEL 54 can command the upstream traffic shaper 52 to reduce the bandwidth of data packet transmissions, such that the combined bandwidth of voice packets and data packets does not exceed the available upstream bandwidth. As such, the number of dropped voice packets during a VoIP call can be reduced to preserve QoS for the call.

Upon at least one communication channel corresponding to a voice call opening at the terminal adapter 14, the upstream BEL 54 can begin a measurement cycle to estimate an amount of available upstream bandwidth between the near-end communication system 10 and the far-end communication device. The estimate of the available upstream bandwidth can be based on lost packet data contained in communication link packets periodically transmitted from the far-end communication device and received at the terminal adapter 14 from which the VoIP call originated. The lost packet data can be indicative of a number of lost voice packets or a percentage of lost voice packets over a period of time. For example, in the real time control protocol (RTCP) standard, a communication link packet can include a receiver report having a fraction lost field. The fraction lost field can be a field within the receiver report packet indicating a percentage of lost packets since the last receiver report was sent. However, it is to be understood that other types of communication link packets indicating lost packet information can be used.

The upstream BEL 54 can access a configuration parameter set 56 from a memory 58 prior to performing a measurement cycle. As the terminal adapter 14 can be portable, and thus frequently powered-down, the memory 58 can be a non-volatile memory, such as a flash memory, EEPROM, and the like. The upstream BEL 54 can utilize the configuration parameter set 56 to determine operational parameters for performing a measurement cycle. As an example, the configuration parameter set 56 can be a set of predetermined configuration parameters that can be defined by a respective VSP. As such, the configuration parameter set 56 can be stored initially by the VSP prior to distribution, and/or can be set in the terminal adapter 14 by the VSP via periodic and/or automatic downloads. Additionally or alternatively, the configuration parameter set 56 can be adjusted by the respective end-user of the terminal adapter 14. Thus, the configuration parameter set 56 can be a set of parameters that is programmable by the VSP and/or a user for performing a measurement cycle in estimating available upstream bandwidth.

One parameter in the configuration parameter set 56 can be a default setting for available upstream bandwidth. For example, a measurement cycle may only occur during an actual call, and can be interrupted if a given call is not long enough in duration for a measurement cycle to finish. As such, the upstream traffic shaper 52 may need a default setting of available upstream bandwidth to which upstream voice and data traffic can be shaped. An example of such an occurrence can include initial installation of the terminal adapter 14. As another example, upon the terminal adapter 14 being powered-up, it can be configured to detect a network address, such as an Internet Protocol (IP) address, within the WAN. The network address can be stored, for example, in the memory 58, along with an available upstream bandwidth estimate as determined from a prior measurement cycle. As different far-end communication devices can have different amounts of available bandwidth, an available upstream bandwidth estimate can be different from one far-end communication device to the next and from one physical address on the network to the next. Therefore, if the terminal adapter 14 determines that the network address has changed upon power-up, for example, relative to the network address stored in the memory 58, the terminal adapter 14 can ignore the available upstream bandwidth estimate as determined from the prior measurement cycle and can access the configuration parameter set 56 to retrieve the default available upstream bandwidth value.

Another example of configuration parameters in the configuration parameter set 56 can be parameters related to frequency of estimation of available upstream bandwidth. For example, as will be described in greater detail below, a measurement cycle for performing an estimate of available upstream bandwidth may temporarily degrade QoS for a given voice call. In addition, as described above, available upstream bandwidth may differ from one upstream communication target to the next. To balance the temporary degradation of QoS for a call and the disruption of local data traffic with responsive tracking of fluctuations of upstream bandwidth and network conditions, the configuration parameter set 56 can include timing parameters that dictate the circumstances for when a measurement cycle to estimate available upstream bandwidth can be performed.

By way of further example, the frequency of how often to perform a measurement cycle to estimate available upstream bandwidth can be based on a number of VoIP calls, such as to perform a measurement cycle every Nth call, where N is a positive integer denoting a number of voice calls between successive measurement cycles. The number of calls N can be based on the number of channel activations, such that multiple phones 20 coupled to the terminal adapter 14 can each contribute to the accumulated total number of calls. As another example, the frequency of how often to perform a measurement cycle can be based on a number of minutes M that have transpired, where M is a positive integer. For example, M can represent a number of minutes that have elapsed since a last measurement. As another example, M can represent a number of minutes of VoIP calls that have been made, such that M denotes a number of minutes having transpired in any number of voice calls between successive measurement cycles. In addition, the configuration parameter set 56 could stipulate that the sooner of an elapsed time M and a number of calls N be used to set the frequency of measurement cycles for estimating available upstream bandwidth. The VSP and/or the terminal adapter 14 may dictate (e.g., by setting an appropriate configuration parameter) that a measurement cycle should never occur for certain calls, such as calls during business hours and/or 911 emergency calls, such that QoS for those certain calls is not compromised by a measurement cycle. Furthermore, the VSP and/or the terminal adapter 14 may incorporate one or more algorithms that modify the one or more frequency of measurement parameters based on call trends.

Upon initiating a measurement cycle to estimate available upstream bandwidth, the upstream BEL 54 can command the upstream traffic shaper 52 to begin throttling (i.e., reducing or limiting) data transmissions associated with the one or more computers 18. The data transmissions can be throttled to an amount that can be included in the configuration parameter set 56, which can be low (e.g., approximately 5-10 kbps) relative to voice transmissions. However, as web browsing and other data communication activities asymmetrically utilize receive bandwidth, and not transmission bandwidth, such upstream bandwidth throttling is likely to be unnoticed by an end-user. The data transmissions can be throttled to determine a nominal value of the data associated with lost packets relative to a steady state of activity of the WAN. For example, other devices attached to the WAN may also be communicating with the far-end communication device, and thus may contribute to an amount of available upstream bandwidth. The nominal value can thus provide a starting point for the measurement cycle, as described herein, which takes into account other network activity, and can be determinable by the upstream BEL 54 based on the data indicating lost packets contained in the communication link packets received from the far-end communication device.

The data indicating lost packets can be received from the communication link packets and monitored by the upstream BEL 54. The upstream BEL 54 could be configured to monitor packet loss data from each of the communication link packets. The packet loss data can contain a value that provides an indication of lost packets between transmission of sequential communication link packets. As a further example, the upstream BEL 54 could monitor cumulative data associated with a plurality of consecutive communication link packets. For instance, the upstream BEL 54 includes a filter 60 configured to implement a filtering algorithm on the packet loss data associated with the lost packets (i.e., the data associated with lost packets from each of the received communication link packets) to achieve a smoothed lost packets data function. The filter can include a first order filtering algorithm having a smoothing coefficient associated with the data indicating lost packets from a plurality of consecutive communication link packets. In addition, to avoid skewing the monitored data associated with duplicate or missing communication link packets, the upstream BEL 54 can discard duplicate communication link packets and/or can extrapolate lost packet data associated with lost communication link packets based on trends.

In the above described example of the communication link packets being receiver report packets having a fraction lost field, the upstream BEL 54 can generate and monitor a smoothed fraction lost value. As an example, the smoothed fraction lost value can be determined based on the following equation:

$$SFL(i) = \alpha * FL(i) + (1-\alpha) * SFL(i-1) \quad \text{Equation 1}$$

Where: $SFL(i)$=Smoothed Fraction Lost at Receiver Report Instance i
$\alpha$=Smoothing Coefficient
$FL(i)$=Instantaneous Fraction Lost at Receiver Report Instance i The Smoothing Coefficient $\alpha$ can have a value chosen between zero and one that is optimized for both convergence and smoothing. For example, the Smoothing Coefficient can dictate that the observed smoothed output gradually and asymptotically approximates the input. Thus, the Smoothing Coefficient $\alpha$ can have a value closer to one for faster convergence, or can have a value closer to zero for smoother data transitions. The $SFL(i)$ initial value can be chosen as zero, although it can be given the first $FL(i)$ value for faster convergence. It is to be understood that the filter 60 is not limited to Equation 1, and can utilize any of a variety of filter algorithms to generate filtered data (e.g., moving average).

The nominal value of the upstream bandwidth can thus be ascertained based on the monitored data, such as via the filter algorithm of Equation 1. To achieve a stable value for the nominal value of the upstream bandwidth, upstream BEL 54 may delay proceeding with the measurement cycle until it receives a predetermined number of communication link packets, which predetermined number can be a programmable parameter in the configuration parameter set 56. As such, the nominal value can be less likely to be inaccurate based on a fluctuation of the upstream bandwidth, as can be indicated by only a single instance of monitored data. Upon the monitored data reflecting a stable nominal value of the upstream bandwidth, the upstream BEL 54 can proceed with the measurement cycle by commanding the upstream traffic shaper 52 to begin increasing transmitted upstream bandwidth.

In the example of FIG. 2, the upstream traffic shaper 52 includes a synthetic traffic generator 62. The synthetic traffic generator 62 can be configured to generate synthetic packets, such that the upstream traffic shaper 52 can transmit the synthetic packets upstream to increase transmitted upstream bandwidth. The synthetic packets can include "dummy data" that can be predefined and can be stored in the memory 58 (e.g., as part of the configuration parameter set 56). The synthetic packets can also have header information that is configurable by the VSP, such as source and destination IP addresses, IP protocol type, payload pattern, etc. As such, the header information can be stored in the configuration parameter set 56, as well. In addition, because the synthetic packets have no purpose other than network congestion, the predetermined parameters established by the VSP can include an appropriate destination for the synthetic packets to be discarded in the network. Furthermore, to mitigate degradation in QoS during a measurement cycle, the upstream traffic shaper 52 can give priority to voice packets and/or data packets over the synthetic packets.

In transmitting the synthetic packets, the upstream traffic shaper 52 can vary the amount of transmitted upstream bandwidth. As such, the upstream traffic shaper 52 can gradually increase the transmission of the synthetic packets, such as based on a graduated step function. For example, the upstream traffic shaper 52 can transmit the synthetic packets at steps, such as 50 kbps, for a predetermined period of time and/or number of packets before increasing the transmission bandwidth of the synthetic packets to 100 kbps for the predetermined period of time, and so forth in increasing graduated increments of 50 kbps. The size of each step and the predetermined period of time and/or number of packets transmitted before increasing to the next step can both be parameters that are predetermined by the VSP, and can thus be stored in the configuration parameter set 56. The size and each step and the predetermined period of time before increasing to the next step can also vary from one step to the next, such as based on an equation. In addition, the period of time and/or number of packets transmitted between increasing the step size of the synthetic packet bandwidth can be event driven instead of based on a fixed amount of time. For example, the upstream traffic shaper 52 could increase the synthetic packet bandwidth according to the step size based on the lost packet data received in one or more communication link packets. As such, the increase of the synthetic packet bandwidth can be responsive to the data associated with the lost packets. In addition, the step size for each step can be variable based on the data associated with lost packets in the communication link packets. As an example, the upstream traffic shaper 52 can increase the synthetic packet bandwidth in smaller steps in response to a degradation in QoS, as observed by the upstream BEL 54 based on the data associated with lost packets in the communication link packets.

The upstream BEL 54 can continue to monitor the data associated with the lost packets, such as the filtered data, as the synthetic packet bandwidth increases. Upon the upstream bandwidth, including the voice packets, the throttled data packets, and the synthetic packets transmitted from the upstream traffic shaper 52 exceeding an available amount of upstream bandwidth, the data indicating lost packets in a communication link packet may exhibit a significant change in an amount of lost voice packets. For example, a fraction lost field in a receiver report packet may increase significantly upon the transmitted upstream bandwidth exceeding the available amount of upstream bandwidth, resulting from a memory buffer overload of one or more upstream components, such as a near-end modem or a device within the WAN. The upstream BEL 54 can compare the monitored data (e.g., the filtered data associated with the lost packets) with a trigger threshold. The trigger threshold can be a percentage value above the nominal value associated with the lost packets data, and thus can be representative of an amount of degradation of QoS that can be determinative of the available upstream bandwidth. For example, the trigger threshold can correspond to a percentage of lost voice packets beyond which QoS is unacceptable, and is thus indicative of a maximum available upstream bandwidth. The trigger threshold can be a parameter that is predetermined by the VSP, and thus can be a parameter that is stored in the configuration parameter set 56.

Upon the monitored data exceeding the trigger threshold, the upstream BEL 54 has determined that the maximum available upstream bandwidth has been exceeded. Because the monitored data may not be representative of instantaneous packet loss data associated with lost packets, such as in the case of filtered data, and because of factors such as step size and duration of synthetic packet bandwidth, the upstream traffic shaper 52 may overshoot the maximum available upstream bandwidth by a certain margin. As a result, the upstream BEL 54 provides a command to the upstream traffic shaper 52 to begin decreasing the synthetic packet bandwidth to determine the available upstream bandwidth. It is to be understood that the configuration parameter set 56 can include a maximum synthetic packet bandwidth value to avoid vastly overshooting the maximum available upstream bandwidth in the event that the communication link packets received from the far-end communication device inaccurately reflects QoS degradation via the data associated with lost packets.

The decrease in synthetic packet bandwidth can be implemented in steps of predetermined amount of bandwidth and time, similar to the increase of synthetic packet bandwidth described above. Alternatively, the steps may be smaller in size for the decrease in synthetic packet bandwidth than for the increase in synthetic packet bandwidth, such that the maximum available upstream bandwidth can be determined with greater precision. The decrease in synthetic packet bandwidth can continue until the monitored data decreases below a lower threshold, such as a value that is substantially between the nominal value and the trigger threshold. The lower threshold can be a value that is stored in the configuration parameter set 56. For example, the lower threshold can be a small percentage of lost packets greater than the percentage of lost packets at the nominal value. Thus, at approximately the lower threshold, the total transmitted bandwidth (i.e., bandwidth of voice packets, throttled data packets, and synthetic packets) is slightly less than the maximum available upstream bandwidth.

The upstream BEL 54 can estimate the available upstream bandwidth based on total transmitted bandwidth upon the monitored data decreasing below the lower threshold. As the throttled data packets may be negligible, the estimated available upstream bandwidth could be equal to the sum of the bandwidth associated with the synthetic packets and the bandwidth associated with the voice packets. The upstream BEL 54 can save the estimate in the memory 58, such that the upstream traffic shaper 52 can access and use the estimate as a basis for subsequently shaping data and voice transmission bandwidth. For example, the upstream traffic shaper 52 can access the available upstream bandwidth estimate from the memory 58 and use the estimate to shape data communications so as not to exceed the available upstream bandwidth, thus preserving QoS for a given VoIP phone call. In addition, the available upstream bandwidth estimate that is stored in the memory 58 and used by the upstream traffic shaper 52 can be based on several measurement cycles, such that it can be an average of multiple instantaneous estimates of available upstream bandwidth based on two or more measurement cycles.

The upstream traffic shaper 52 need not utilize the exact available upstream bandwidth estimate to shape data and voice transmission bandwidth. For example, the configuration parameter set 56 can also include a relative bandwidth margin parameter that defines a small percentage margin (e.g., 5%) less than the available upstream bandwidth estimate. The upstream traffic shaper 52 can shape data and voice transmission bandwidth at the small percentage margin less than the available upstream bandwidth estimate to account for inaccuracies in the measurement cycle and/or bandwidth fluctuations in the WAN 22.

As described above, the terminal adapter 14 can implement the estimation of available upstream bandwidth automatically and periodically, such as determined by one or more parameters stored in the configuration parameter set 56. As such, the estimation of available upstream bandwidth can be completely transparent to an end-user, and can adaptively track network fluctuations. As described above, the estimation can be based on the pre-existing communication link packets, such as receiver report packets in the RTCP standard. Thus, the estimate is an end-to-end estimate of available upstream bandwidth, and the system can work with existing network architectures and implementations. Furthermore, the estimate can be implemented for a single VoIP channel, or multiple VoIP channels concurrently, such that the estimate of available upstream bandwidth can be accurate and efficient.

It is to be understood that the system for estimating available upstream bandwidth and traffic shaping is not intended to be limited by the example of FIGS. 1 and 2. For example, one or more of the components within the terminal adapter 14 could be configured external to the terminal adapter 14. Thus, any of a variety of additional equipment and configurations can be included in the system for estimating available upstream bandwidth and traffic shaping.

Figure 3:
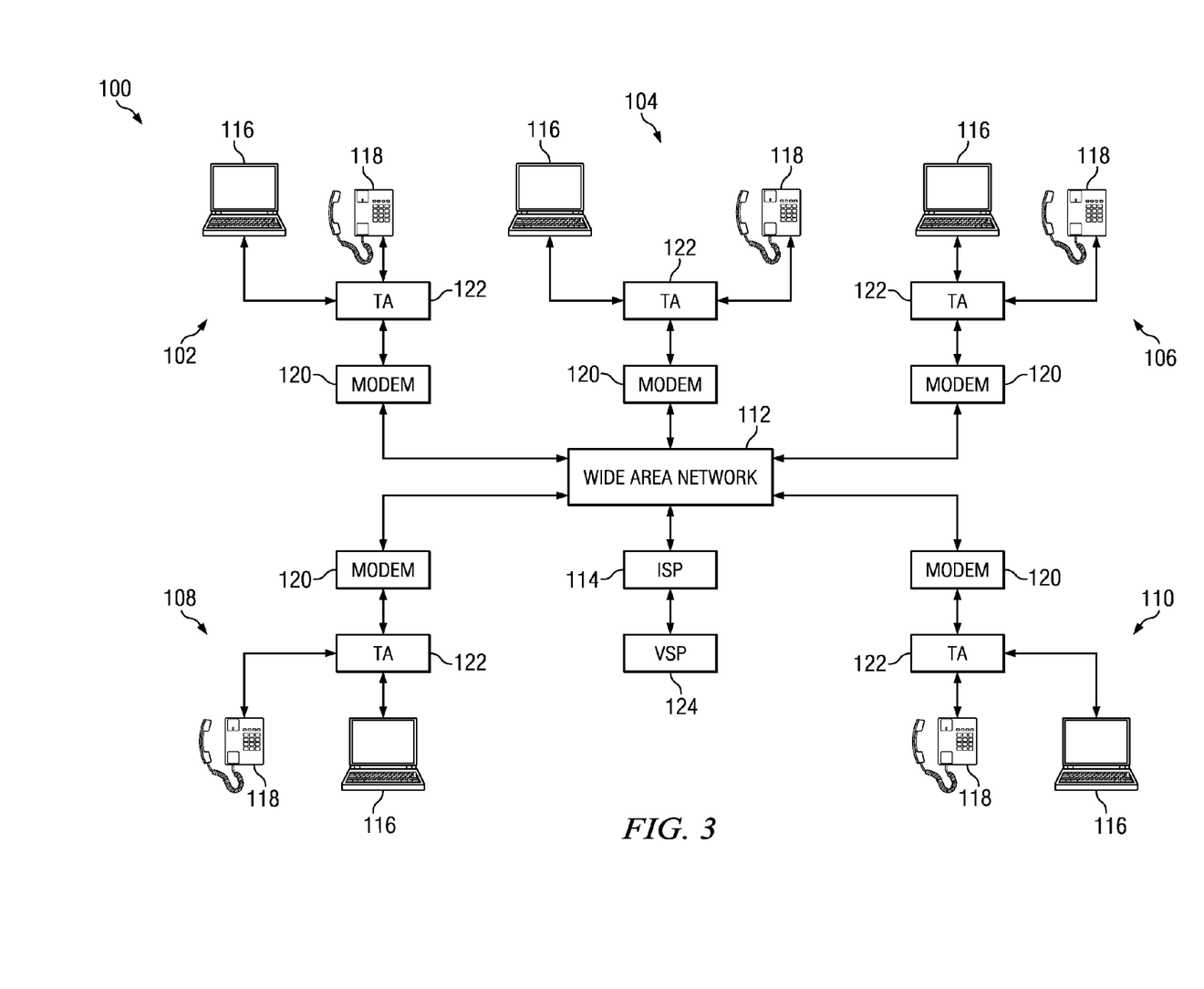
FIG. 3 illustrates an example of a network in accordance with an aspect of the invention.

FIG. 3 illustrates an example of a network 100 in accordance with an aspect of the invention. The network 100 includes a plurality of end-user communication systems, five of which are demonstrated in the example of FIG. 1 as end-user communication systems 102, 104, 106, 108, and 110. Each of the end-user communication systems 102, 104, 106, 108, and 110 could be a residential location, such as an end-user's home, or could be a small business, enterprise location, or a service provider gateway between VoIP and PSTN. Each of the end-user communication systems 102, 104, 106, 108, and 110 is coupled to a WAN 112. At least one ISP 114 is also coupled to the network to provide communication connectivity of the end-user communication systems 102, 104, 106, 108, and 110 with the WAN 112. It is to be understood that the at least one ISP 114 is demonstrated in the example of FIG. 3 as coupled separate from the end-user communication systems 102, 104, 106, 108, and 110 for simplicity, but that each of the end-user communication systems 102, 104, 106, 108, and 110 are coupled to the WAN 112 through the at least one ISP 114, which could be a separate ISP 114 for each of the end-user communication systems 102, 104, 106, 108, and 110.

In the example of FIG. 3, each of the end-user communication systems 102, 104, 106, 108, and 110 includes one or more computers 116, one or more phones 118, a modem 120, and a terminal adapter (TA) 122. Accordingly, each of the end-user communication systems 102, 104, 106, 108, and 110 can be configured substantially similarly to the near-end communication system 10 in the example of FIG. 1 to provide an interface for data communications from the computer(s) 116 and voice communications from the phone(s) 118 to another the one of the end-user communication systems 102, 104, 106, 108, and 110 via the WAN 112. It is to be understood that the end-user communication systems 102, 104, 106, 108, and 110 are not limited to coupling computers 116 and phones 118 to the WAN 112, as demonstrated in the example of FIG. 3, but can include any number of a variety of different network devices (e.g., printers) coupled to a respective one or more of the TAs 122. It is also to be understood that the end-user communication systems 102, 104, 106, 108, and 110 may not be configured substantially the same. For example, although the modem 120 and the TA 122 are numbered the same for each of the end-user communication systems 102, 104, 106, 108, and 110, they may not be the configured identically. Thus, a modem 120 for a given one of the end-user communication systems 102, 104, 106, 108, and 110 can be configured as a cable modem to provide broadband connectivity to the WAN 112, while a modem 120 of another of the end-user communication systems 102, 104, 106, 108, and 110 can be configured as a DSL modem. As such, each of the end-user communication systems 102, 104, 106, 108, and 110 can have different amounts of bandwidth available for transmission and receipt of voice and/or data packets.

One or more of the phones 118 can be a phone configured to communicate via VoIP. As such, the phone 118 of one of the end-user communication systems 102, 104, 106, 108, and 110 can be configured to transmit and receive voice packets to one of the other end-user communication systems 102, 104, 106, 108, and 110, or any of a variety of other locations not demonstrated in the example of FIG. 3, via the WAN 112. As another example, one or more of the phones 118 could be a standard phone configured to communicate via PSTN. As such, one or more of the end-user communication systems 102, 104, 106, 108, and 110 can include an interface to convert the voice communications of a given phone 20 from the PSTN protocol to VoIP for voice packet communication to and from the WAN 112. The WAN 112 includes at least one VSP 124 that provides voice communication service to a subscriber at one or more of the end-user communication systems 102, 104, 106, 108, and 110 via the at least one ISP 114. Thus, the at least one VSP 124 can provide voice communication capability between the end-user communication systems 102, 104, 106, 108, and 110.

One or more of the terminal adapters 122 can be configured substantially similar to the terminal adapter 14 in the example of FIG. 2. Therefore, one or more of the terminal adapters 122 can be configured to adaptively estimate an amount of available upstream bandwidth, similar to as described above regarding the example of FIG. 2. As such, a traffic shaper, such as can be included in the respective terminal adapter 122, can be configured to shape data communications so as not to exceed the available upstream bandwidth, thus preserving QoS for subsequent VoIP phone calls from a respective one or more of the phones 118.

The following describes a brief example of a measurement cycle for estimating available upstream bandwidth. An end-user at the end-user communication system 108 places a call to an end-user at the end-user communication system 106. It is to be assumed that the real upstream bandwidth of a connection between the terminal adapter 122 at the end-user communication system 108 to the terminal adapter 122 at the end-user communication system 106 is approximately 1 Megabit per second (Mbps). It is also to be assumed that the throttled data packet transmission bandwidth is approximately 10 kilobits per second (kbps), and that the voice traffic bandwidth is approximately 120 kbps. During the measurement cycle, an upstream traffic shaper, such as can be included in the terminal adapter 122 at the end-user communication system 108, gradually increases the synthetic packet bandwidth in 100 kbps step size increments. Upon the total transmitted bandwidth being 930 kbps of total bandwidth (120 kbps+10 kbps+8*100 kbps), there is still substantially no voice packet loss because 930 kbps is less than 1,000 kbps=1 Mbps. However, one or more additional steps cause the composite bandwidth to exceed 1 Mbps, which can be reflected in the data associated with lost packets, as monitored by a respective upstream BEL, such as can be included in the terminal adapter 122 (e.g., via a filtering algorithm, such as Equation 1). The upstream traffic shaper then begins to decrease the synthetic data bandwidth, such as through steps of 50 kbps, until substantially no degradation of QoS is observed (e.g., via the filtering algorithm). The resulting bandwidth is the estimate of the available upstream bandwidth. For example, the upstream BEL can estimate that the available upstream bandwidth is approximately 980 kbps. The upstream traffic shaper can access and use this estimate until another measurement cycle is performed. Accordingly, during a subsequent call of approximately 120 kbps bandwidth, the upstream traffic shaper can shape the data packet transmission bandwidth to approximately 860 kbps (980 kbps−120 kbps) to preserve QoS resulting from substantially no dropped voice packets.

Figure 4:
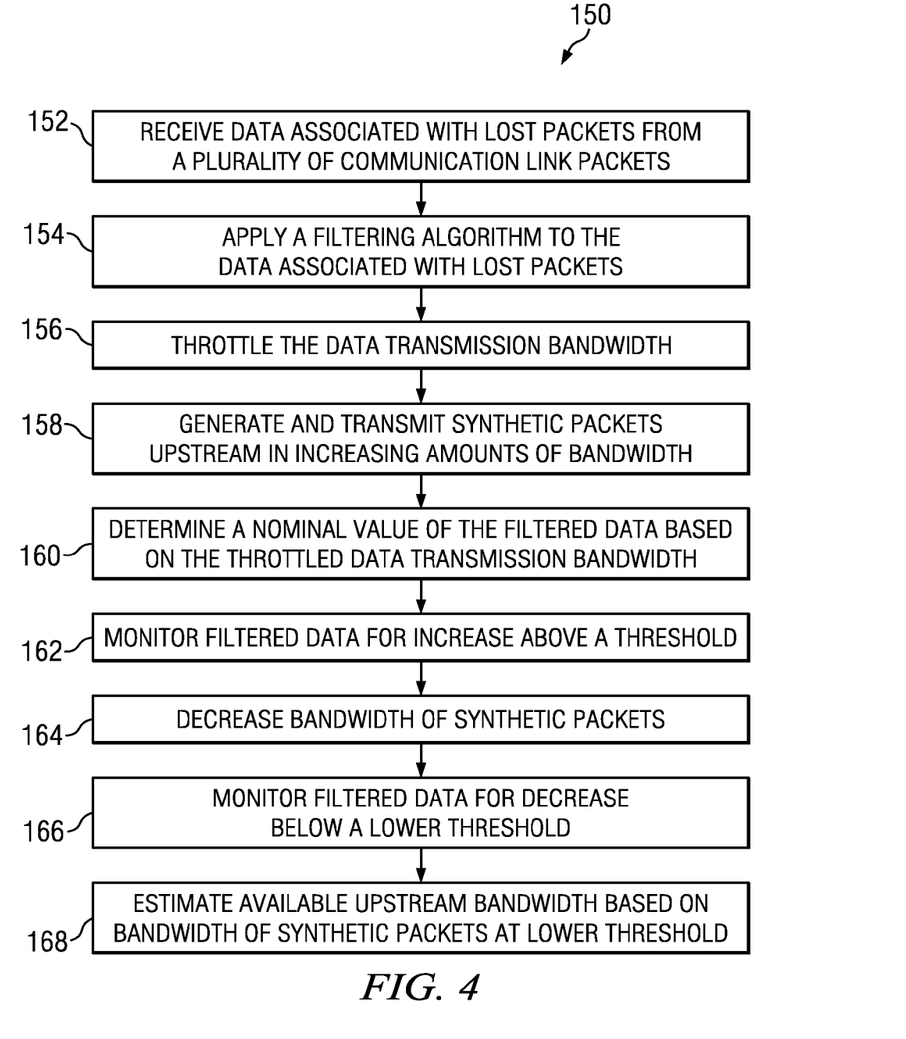
FIG. 4 illustrates an example of a method for adaptively estimating upstream bandwidth in accordance with an aspect of the invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., a computer or a computer network), software (e.g., as executable instructions running on one or more computer systems), or any combination of hardware and software.

FIG. 4 illustrates an example of a method 150 for adaptively estimating available upstream bandwidth in a network. The network can include data packet transmissions and voice packet transmissions. At 152, data associated with lost packets is received from each of a plurality of communication link packets. The plurality of communication link packets can be transmitted from a communication destination device, and can correspond to lost voice packets. The data associated with lost packets could be fraction lost data in each of a plurality of receiver reports, indicating how many packets have been lost since the last receiver report packet was transmitted. At 154, the data associated with lost packets is filtered. The filtering of the data associated with lost packets can be a filter algorithm including a first order smoothing coefficient. The filter algorithm can include data associated with lost packets from a plurality of consecutive communication link packets, such that it can provide an aggregate indication of lost packets over time, such as demonstrated above by Equation 1.

At 156, data transmission bandwidth is throttled. The data transmission bandwidth can be associated with one or more downstream computers. At 158, a nominal value of the filtered data associated with lost packets is determined based on the throttled data transmission bandwidth. The nominal value of the filtered data can be representative of the number of lost packets in a steady state of the network. At 160, synthetic packets are generated and transmitted upstream in increasing amounts of bandwidth. The synthetic packets can contain dummy data and can be transmitted at an increasing rate. As used herein, the term rate (as applied to transmission of packets of information) relates to the bits per second. Thus, an increasing transmission rate of the synthetic packets can result, for example, by transmitting the same amount of data more frequently or by increasing the amount of data that is transmitted at a substantially fixed interval or a combination thereof, such that an overall increase in the bandwidth occurs. The increase in the amount of bandwidth can correspond to a predetermined incremental step function. The incremental step size can be fixed or can change based on network conditions, such as by implementing a decrease in step size upon an observed degradation in QoS. The size of each step can also change at a predefined rate, such as based on a function of time or based on a number of transmitted synthetic packets. At 162, the filtered data is monitored for increase above a threshold. The threshold can be a predetermined percentage above the nominal value. The threshold can correspond to the transmitted bandwidth exceeding the available upstream bandwidth.

At 164, the bandwidth associated with the synthetic packets is decreased. The decreasing of the bandwidth associated with the synthetic packets can also be a step function, with a step size that can be less than the step size when increasing synthetic packet bandwidth. At 166, the filtered data is monitored for decrease below a lower threshold. The lower threshold can be a percentage value substantially near the nominal value. The lower threshold can correspond to a point at which the transmitted bandwidth is approximately the available upstream bandwidth. At 168, the available upstream bandwidth is estimated based on the bandwidth associated with the synthetic packets at the lower threshold.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A method for adaptively estimating available upstream bandwidth in a network, the method comprising:
monitoring data indicative of a number of lost packets at a near-end communication device, the data indicative of a number of lost packets being transmitted from a far-end communication device;
increasing an amount of upstream bandwidth transmission from the near-end device to the far-end device until the monitored data exceeds a first threshold comprising generating purely a plurality of synthetic packets and transmitting a first portion of the plurality of synthetic packets at an increasing rate, wherein the plurality of synthetic packets have no purpose other than network congestion;
calculating an estimated available upstream bandwidth based on a portion of a maximum amount of the upstream bandwidth transmission;
transmitting a second portion of the plurality of synthetic packets at a decreasing amount of bandwidth until the filtered data decreases below a second threshold that is less than the first threshold, upon the monitored data exceeding the first threshold; and
estimating the available upstream bandwidth in response to the monitored data decreasing below the second threshold, the available upstream bandwidth being estimated by the bandwidth estimation logic based on a sum of the amount of bandwidth associated with the synthetic packets and an amount of bandwidth associated with transmitted voice packets.

2. The method of claim 1, wherein calculating the estimated available upstream bandwidth comprises adding the portion of the maximum amount of upstream bandwidth transmission associated with the transmitted synthetic packets and a bandwidth associated with transmitted voice packets.

3. The method of claim 1, wherein the threshold is a first threshold, the method further comprising decreasing the amount of the upstream bandwidth transmission upon the monitored data exceeding the first threshold until the monitored data decreases below a second threshold that is lower that the first threshold.

4. The method of claim 3, wherein the increasing the upstream bandwidth transmission further comprises increasing the upstream bandwidth transmission at a first rate, and wherein the decreasing the upstream bandwidth transmission comprises decreasing the amount of the upstream bandwidth transmission at a second rate that is less than the first rate.

5. The method of claim 1, further comprising:
receiving a plurality of communication link packets transmitted by the far-end communication device, each of the plurality of communication link packets comprising packet loss data indicative of a number of packets lost since a previously transmitted one of the plurality of communication link packets; and
filtering the packet loss data from a plurality of sequential communication link packets to generate the monitored data.

6. The method of claim 5, further comprising updating the filtering of the packet loss data at a rate that does not exceed a rate at which the plurality of communication link packets are received.

7. The method of claim 1, further comprising establishing a nominal value associated with the monitored data in a steady state of operation of the network, the monitoring of the data indicative of a number of lost packets further comprising monitoring the data indicative of a number of lost packets if the monitored data exceeds the nominal value.

8. The method of claim 7, wherein establishing the nominal value comprises throttling down upstream data packet bandwidth associated with at least one downstream computer.

9. The method of claim 1, wherein increasing the amount of the upstream bandwidth transmission comprises increasing the upstream bandwidth transmission by a predetermined bandwidth step size, the method further comprising decreasing the bandwidth step size in response to the monitored data exceeding the second threshold that is less than the first threshold.

10. The method of claim 1, further comprising giving priority to a voice packet or a data packet over a synthetic packet.

11. A network terminal adapter configured to estimate and shape upstream bandwidth, the terminal adapter comprising:
bandwidth estimation logic configured to monitor data indicative of a number of lost packets transmitted from a far-end communication device, the bandwidth estimation logic being further configured to estimate available upstream bandwidth upon the monitored data exceeding a first threshold; and
an upstream traffic shaper configured to allocate upstream bandwidth between voice packets and data packets based on the available upstream bandwidth estimate, said traffic shaper comprising:

a synthetic traffic generator configured to, generate only synthetic packets, the upstream traffic shaper being further configured to transmit the synthetic packets at a bandwidth that increases according to a predetermined step size, upon the monitored data exceeding the first threshold, the upstream traffic shaper transmits the synthetic packets at a decreasing amount of bandwidth until the filtered data decreases below a second threshold that is less than the first threshold, and wherein the bandwidth estimation logic estimated the available upstream bandwidth in response to the monitored data decreasing below the second threshold, the available upstream bandwidth being estimated by the bandwidth estimation logic based on a sum of the amount of bandwidth associated with the synthetic packets and an amount of bandwidth associated with the transmitted voice packets.

12. The terminal adapter of claim 11, wherein the bandwidth estimation logic comprises a filter configured to implement a filter algorithm to generate the monitored data, the filter algorithm comprising a first order smoothing coefficient on packet loss data indicative of a number of lost packets transmitted from a plurality of consecutive communication link packets.

13. The terminal adapter of claim 11, wherein the threshold is a first threshold, and wherein the upstream traffic shaper is further configured to decrease the amount of bandwidth of the synthetic packets in the steps from the predetermined size upon the filtered data exceeding a second threshold, the second threshold being less than the first threshold.

14. The terminal adapter of claim 11, wherein the bandwidth estimation logic estimates the available upstream bandwidth during a measurement cycle, such that the upstream traffic shaper throttles upstream data packet bandwidth associated with at least one downstream computer during the measurement cycle to determine a nominal value of the filtered data, such that the bandwidth estimation logic monitors the filtered data upon the filtered data being greater than the nominal value.

15. The terminal adapter of claim 11, wherein the upstream traffic shaper allocates a predetermined default upstream bandwidth for the voice traffic and the data traffic upon the terminal adapter detecting a change in internet protocol address at power-up.

16. A communication system comprising:

a first communication device coupled to a first computer and a first voice communication device, said first communication device comprising:

a synthetic traffic generator configured to generate only synthetic packets; and a second communication device coupled to a second voice communication device, the second communication device being configured to transmit communication link packets comprising data indicative of a number of lost packets that occur in response to voice transmissions from at least the first voice communication device to the second voice communication device, the first communication device being configured to generate and transmit a first plurality of synthetic packets in an increasing amount of bandwidth, the first communication device monitoring the data indicative of a number of lost packets to generate an available bandwidth estimate for voice and data transmissions from the first communication device to the second communication device in response to the monitored data exceeding a first threshold, upon the monitored data exceeding the first threshold, the first communication device generates and transmits a second plurality of synthetic packets at a decreasing amount of bandwidth until the filtered data decreases below a second threshold that is less than the first threshold, and wherein the first communication device estimates the available upstream bandwidth in response to the monitored data decreasing below the second threshold, the available upstream bandwidth being estimated by the bandwidth estimation logic based on a sum of the amount of bandwidth associated with the synthetic packets and an amount of bandwidth associated with transmitted voice packets.

17. The system of claim 16, wherein the first communication device comprises a filter configured to implement a filter algorithm comprising a first order smoothing coefficient on the data indicative of a number of lost packets transmitted from a plurality of consecutive communication link packets.

18. The system of claim 16, wherein the first threshold defines an upper limit for lost packets, and in response to the data indicative of a number of lost packets exceeding the first threshold, the first communication device transmits the synthetic packets at a bandwidth that incrementally decreases until the data indicative of a number of lost packets decreases below a second threshold that is lower than the first threshold.

* * * * *